(12) United States Patent
Parsons et al.

(10) Patent No.: US 10,955,605 B1
(45) Date of Patent: Mar. 23, 2021

(54) MULTI-LAYERED SUBSTRATES FOR WAVEGUIDE DISPLAYS

(71) Applicant: Facebook Technologies, LLC, Menlo Park, CA (US)

(72) Inventors: Maxwell Parsons, Seattle, WA (US); Giuseppe Calafiore, Redmond, WA (US); Wanli Chi, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 121 days.

(21) Appl. No.: 15/963,304

(22) Filed: Apr. 26, 2018

Related U.S. Application Data

(60) Provisional application No. 62/519,703, filed on Jun. 14, 2017.

(51) Int. Cl.
| | |
|---|---|
| *G02B 27/01* | (2006.01) |
| *F21V 8/00* | (2006.01) |
| *B32B 7/12* | (2006.01) |
| *B32B 27/06* | (2006.01) |
| *B32B 37/12* | (2006.01) |
| *B32B 37/18* | (2006.01) |

(Continued)

(52) U.S. Cl.
CPC .............. *G02B 6/0065* (2013.01); *B32B 7/12* (2013.01); *B32B 27/06* (2013.01); *B32B 37/12* (2013.01); *B32B 37/15* (2013.01); *B32B 37/18* (2013.01); *B32B 38/0012* (2013.01); *G02B 6/0055* (2013.01); *B32B 2038/0016* (2013.01); *B32B 2038/0064* (2013.01); *B32B 2255/20* (2013.01); *B32B 2305/72* (2013.01); *B32B 2307/416* (2013.01); *B32B 2551/00* (2013.01); *G02B 27/0172* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 10,571,699 B1 | 2/2020 | Parsons et al. | |
| 2014/0140654 A1* | 5/2014 | Brown | G02B 27/0172 385/10 |

(Continued)

OTHER PUBLICATIONS

United States Office Action, U.S. Appl. No. 15/963,359, dated Aug. 15, 2019, 8 pages.

(Continued)

*Primary Examiner* — Chris H Chu
(74) *Attorney, Agent, or Firm* — Fenwick & West LLP

(57) ABSTRACT

A waveguide includes an input area, a multi-layered substrate, and an output area. The multi-layered substrate includes a plurality of layers of at least a substrate and at least one partially reflective layers. The input area in-couples light in a first band into the waveguide. The one or more partially reflective layers are partially reflective to light in the first band. Each of the one or more partially reflective layers are located between respective layers of the plurality of layers of the substrate. The output area out-couples light from the waveguide. The pupil replication density of the out-coupled light is based in part on a number of the one or more partially reflective layers and respective locations of the one or more partially reflective layers in the waveguide.

6 Claims, 11 Drawing Sheets

(51) Int. Cl.
  *B32B 37/15*   (2006.01)
  *B32B 38/00*   (2006.01)

(56) References Cited

U.S. PATENT DOCUMENTS

| | | | |
|---|---|---|---|
| 2015/0064498 A1* | 3/2015 | Tong | H01L 24/29 |
| | | | 428/688 |
| 2015/0205135 A1* | 7/2015 | Border | G02B 5/30 |
| | | | 359/630 |
| 2016/0041387 A1* | 2/2016 | Valera | G02B 27/0101 |
| | | | 385/36 |
| 2017/0285348 A1 | 10/2017 | Ayres et al. | |

OTHER PUBLICATIONS

United States Office Action, U.S. Appl. No. 16/740,328, dated Sep. 8, 2020, 13 pages.

* cited by examiner

MULTI-LAYERED SUBSTRATES FOR WAVEGUIDE DISPLAYS

CROSS REFERENCE TO RELATED APPLICATIONS

This application claims the benefit of U.S. Provisional Application No. 62/519,703, filed on Jun. 14, 2017, which is incorporated by reference in its entirety.

BACKGROUND

The present disclosure generally relates to waveguide displays, and specifically to optical waveguides with multi-layered substrates for better homogeneity of the image displayed.

Near-eye light field displays project images directly into a user's eye, encompassing both near-eye displays (NEDs) and electronic viewfinders. Conventional near-eye displays (NEDs) generally have a display element that generates image light that passes through one or more lenses before reaching the user's eyes. Additionally, NEDs in augmented reality systems are typically required to be compact and light weight, and to provide large exit pupil with a wide field-of-vision for ease of use. However, designing a conventional NED with materials of desired optical properties often results in a very low out-coupling efficiency of the image light received by the user's eyes and often result in poor homogeneity of the image light. Accordingly, conventional optical waveguides used in such NEDs are limited to poor pupil replication density and homogeneity of the image light.

SUMMARY

Embodiments relate to a method for manufacturing an optical waveguide composed of a multi-layered substrate. In some embodiments, the manufacturing system for fabricating the optical waveguide includes a patterning system, a deposition system, and an etching system. The manufacturing system deposits at least one of a first film on a first surface of a first wafer and a second film on a second surface of a second wafer. The first wafer includes a third surface opposite to the first surface, and the second wafer includes a fourth surface opposite to the second surface. The manufacturing system performs a polishing of the first film and the second film deposited on the first surface and the second surface. The manufacturing system performs a bonding of the polished first film on the first surface and the polished second film on the second surface such that the bonding forms a partially reflective layer. The manufacturing system performs a grinding and polishing of the third surface of the first wafer, and the polishing of the third surface creating a first layer of a first thickness. The manufacturing system performs a grinding and polishing of the fourth surface of the second wafer, and the polishing of the fourth surface creating a second layer of a second thickness. Each of the first layer, the partially reflective layer, and the second layer forming a portion of the multi-layered substrate.

Embodiments also relate to an optical waveguide composed of a multi-layered substrate. The optical waveguide formed by depositing a first film on a first surface of a first wafer and a second film on a second surface of a second wafer, performing a polishing of the first film and the second film deposited on the first surface and the second surface, performing a bonding of the polished first film on the first surface and the polished second film on the second surface to form a partially reflective layer, performing a grinding and polishing of the third surface of the first wafer to create a first layer of a first thickness, and performing a grinding and polishing of the fourth surface of the second wafer to create a second layer of a second thickness. Each of the first layer, the partially reflective layer, and the second layer form a portion of the multi-layered substrate. The first wafer includes a third surface opposite to the first surface, and the second wafer includes a fourth surface opposite to the second surface.

Figure 1:
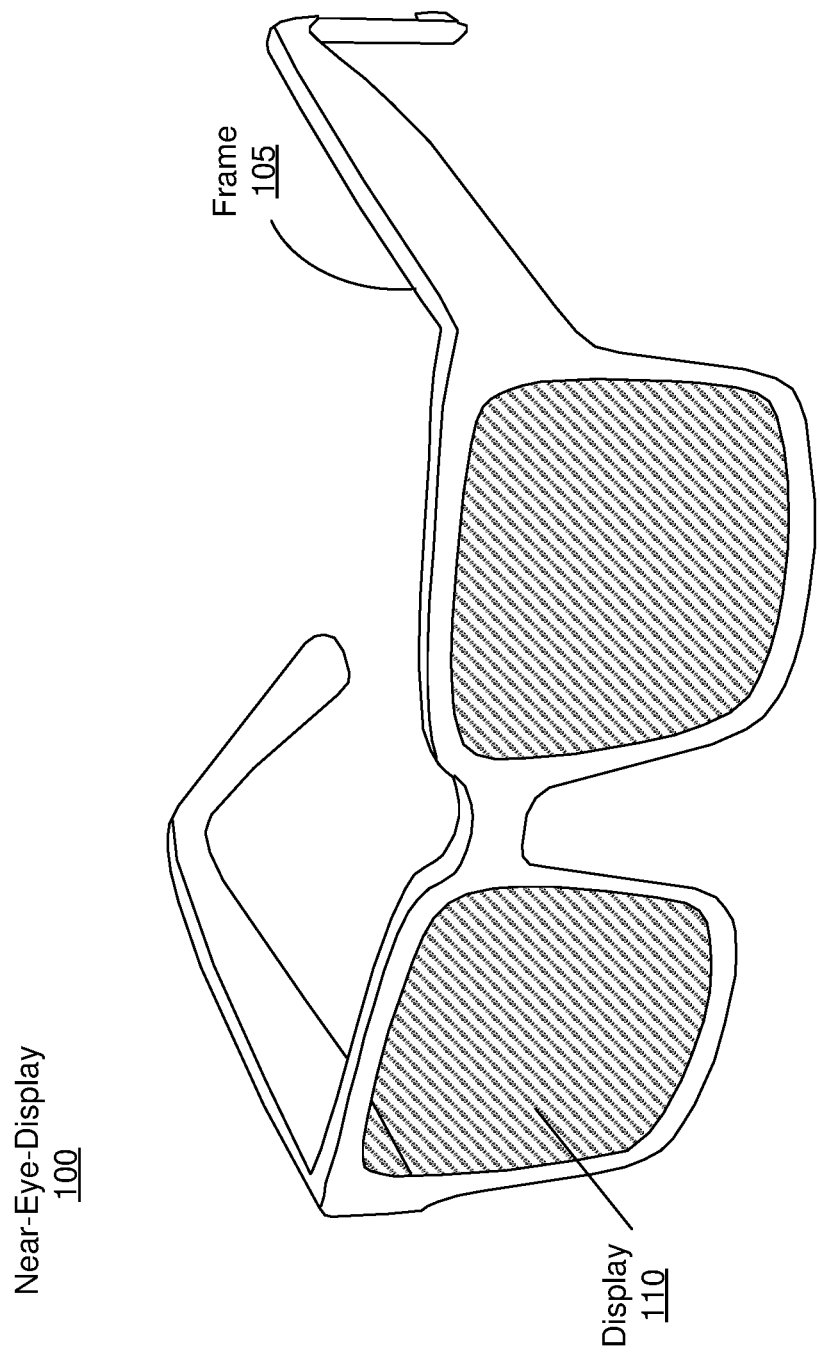
FIG. 1 is a diagram of a near-eye-display (NED), in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A waveguide display includes a light source and an output waveguide. The output waveguide includes an input area, a multi-layered substrate, and an output area. The multi-layered substrate is a substrate that includes a plurality of layers of at least one substrate and at least one partially reflective layer. In some embodiments, the substrate is composed of one or more materials (e.g. glass, polymer, etc.) of refractive index of at least 1.5. Light from the light source is coupled into the output waveguide. Each time light is incident on the at least one reflective layer, the light is split into two portions (i.e., a transmitted portion and a reflected portion). As some of the light is partially reflected by the at least one reflective layer, it effectively increases a density of light rays over the length of the partially reflected layer relative to a similar waveguide with no partially reflective layers. Accordingly, the multi-layered substrate increases a pupil replication density and, thereby, increases homogeneity of the resulting image relative to homogeneity of the resulting in image in conventional waveguides that do not have the at least one partially reflective layer.

As described below in detail with reference to FIG. 8, a manufacturing system fabricates the multi-layered substrate based on a bonding process of one or more substrates and at least one partially reflective layer. As described below in detail with reference to FIG. 9, a manufacturing system fabricates the multi-layered substrate based on a demolding process of one or more substrates and at least one partially reflective layer.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 is a diagram of a near-eye-display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 is coupled to one or more optical elements which together display media to users. In some embodiments, the frame 105 may represent a frame of eye-wear glasses. The display 110 is configured for users to see the content presented by the NED 100. As discussed below in conjunction with FIG. 2, the display 110 includes at least one waveguide display assembly (not shown) for directing one or more image light to an eye of the user. The waveguide display assembly includes, e.g., a waveguide display, a stacked waveguide display, a varifocal waveguide display, or some combination thereof. The stacked waveguide display is a polychromatic display created by stacking waveguide displays whose respective monochromatic sources are of different colors. The varifocal waveguide display is a display that can adjust a focal position of image light emitted from the waveguide display. As described below with reference to FIG. 5, the waveguide display includes an optical waveguide with multi-layered substrate (i.e., includes a plurality of layers of at least a substrate and one or more partially reflective layers). The pupil replication density of the light out-coupled by the optical waveguide is based in part on a number of the one or more partially reflective layers and respective locations of the one or more partially reflective layers in the optical waveguide.

Figure 2:
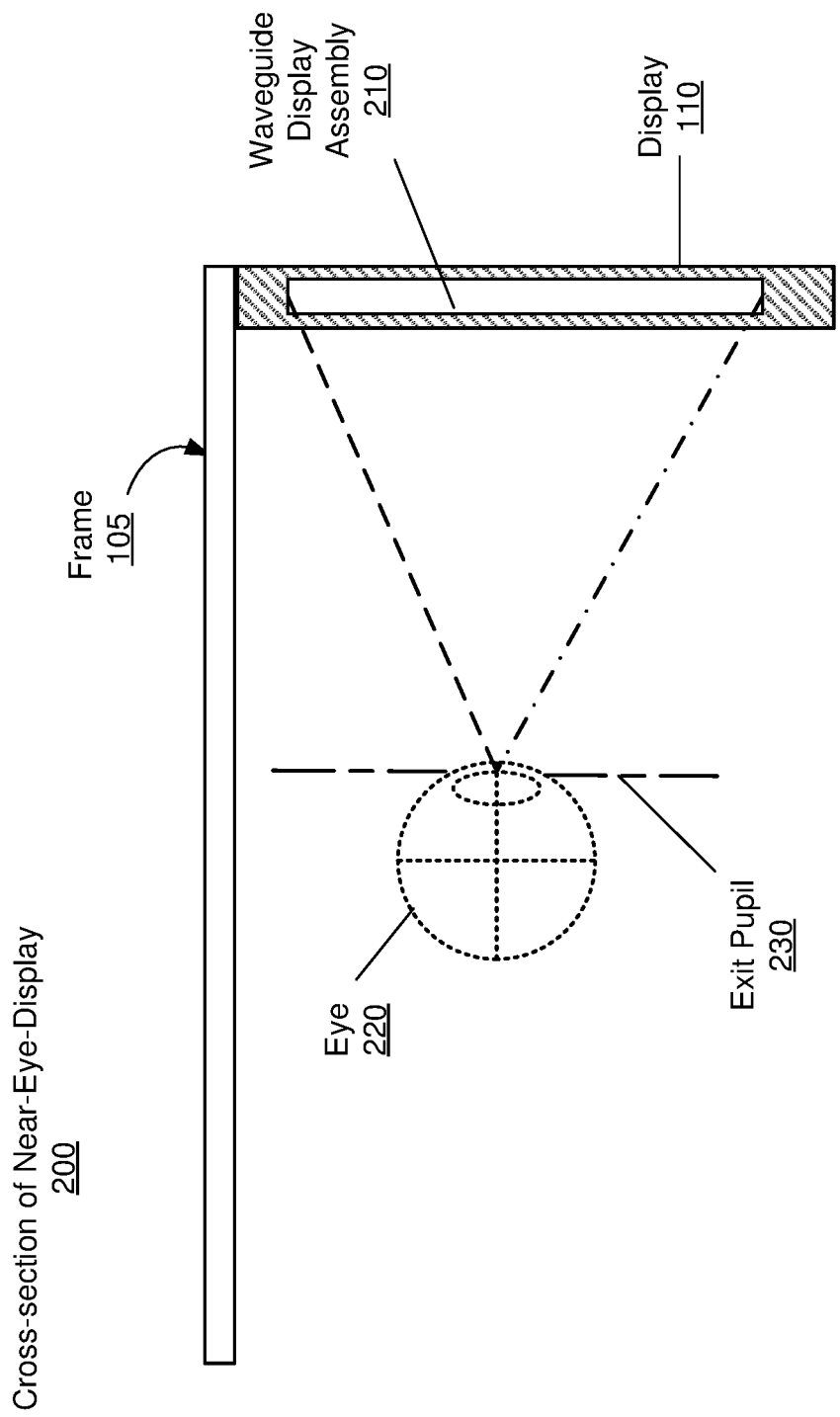
FIG. 2 illustrates an isometric view of a waveguide display, in accordance with an embodiment.

FIG. 2 is a cross-section 200 of the NED 100 illustrated in FIG. 1, in accordance with an embodiment. The display 110 includes at least one waveguide display assembly 210. An exit pupil 230 is a location where the eye 220 is positioned when the user wears the NED 100. For purposes of illustration, FIG. 2 shows the cross section 200 associated with a single eye 220 and a single waveguide display assembly 210, but in alternative embodiments not shown, another waveguide display assembly which is separate from the waveguide display assembly 210 shown in FIG. 2, provides image light to another eye 220 of the user.

The waveguide display assembly 210, as illustrated below in FIG. 2, is configured to direct the image light to the eye 220 through the exit pupil 230. The waveguide display assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the waveguide display assembly 210 and the eye 220. The optical elements may act to, e.g., correct aberrations in image light emitted from the waveguide display assembly 210, magnify image light emitted from the waveguide display assembly 210, some other optical adjustment of image light emitted from the waveguide display assembly 210, or some combination thereof. The example for optical elements may include an aperture, a Fresnel lens, a convex lens, a concave lens, a filter, or any other suitable optical element that affects image light.

In some embodiments, the waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. A varifocal waveguide display is a display that can adjust a focal position of image light emitted from the waveguide display. In alternate embodiments, the waveguide display assembly 210 may include a stacked waveguide display and a varifocal waveguide display. As described below with reference to FIG. 5, the waveguide display includes an optical waveguide with a multi-layered substrate (i.e., a plurality of layers of at least a substrate and one or more partially reflective layers). The pupil replication density of the light out-coupled by the optical waveguide is based in part on a number of the one or more partially reflective layers and respective locations of the one or more partially reflective layers in the optical waveguide.

Figure 3:
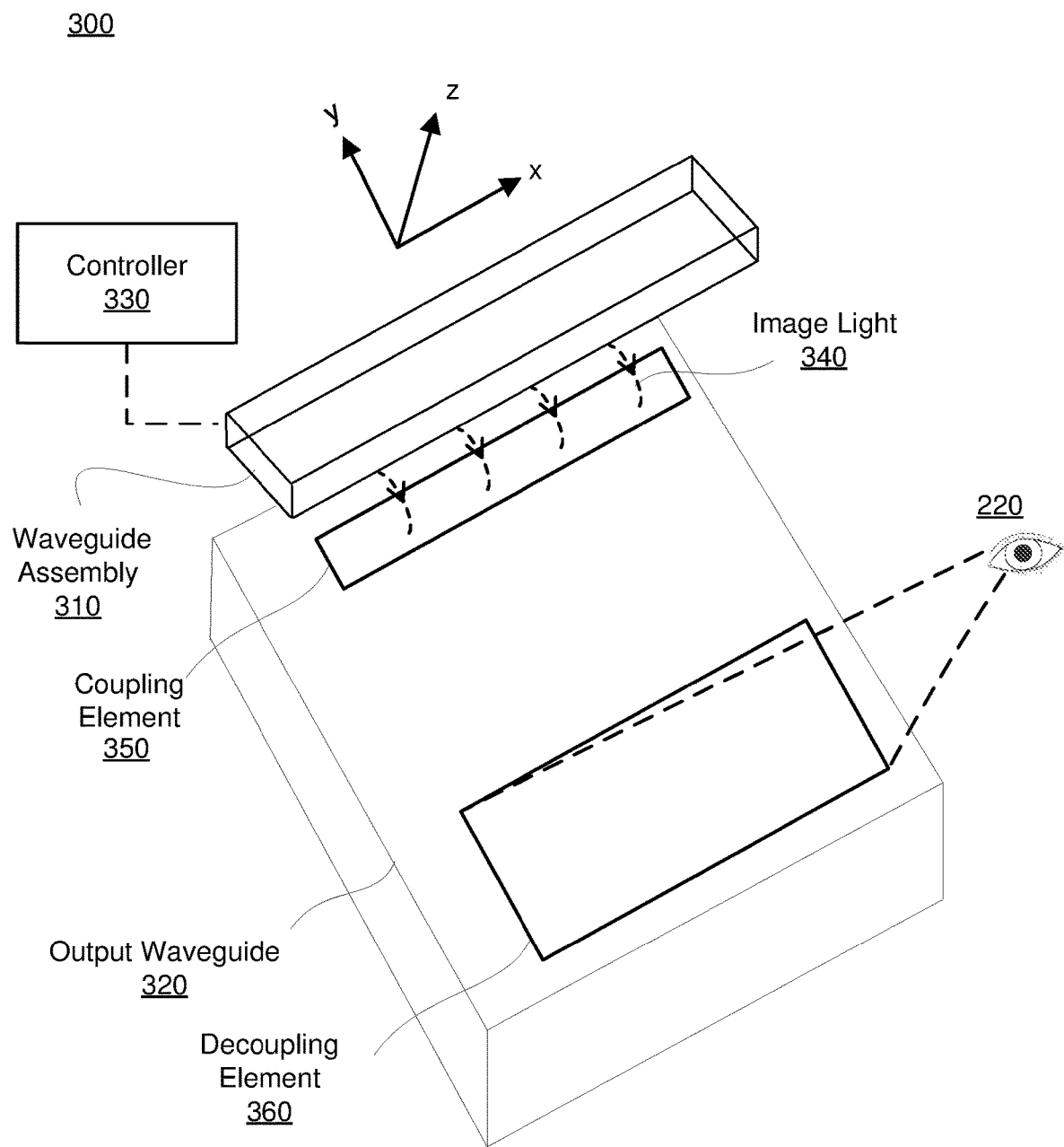
FIG. 3 illustrates an isometric view of a waveguide display, in accordance with an embodiment.

FIG. 3 illustrates an isometric view of a waveguide display 300, in accordance with an embodiment. In some embodiments, the waveguide display 300 (may also be referred to as a scanning waveguide display) is a component (e.g., waveguide display assembly 210) of the NED 100. In alternate embodiments, the waveguide display 300 is part of some other NED, or other system that directs display image light to a particular location.

The waveguide display 300 includes at least a waveguide assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The waveguide assembly 310 generates image light. The waveguide assembly 310 includes an optical source, a source waveguide, and a scanning apparatus (e.g., as further described below with regard to FIG. 4). The waveguide assembly 310 generates and outputs image light 340 to a coupling element 350 of the output waveguide 320.

The output waveguide 320 is an optical waveguide that outputs image light to an eye 220 of a user. As described below with reference to FIG. 5, the output waveguide 320 includes a plurality of layers of at least a substrate and one or more partially reflective layers. The image light exiting the output waveguide 320 is associated with a pupil replication density which is a quantitative measure of replication of the image light 340 received by the output waveguide 320 and outputted as an image light towards the exit pupil of the user's eye 220. The pupil replication density of the light out-coupled by the optical waveguide is based in part on a number of the one or more partially reflective layers and respective locations of the one or more partially reflective layers in the optical waveguide. The output waveguide 320 may be composed of one or more materials that facilitate total internal reflection of the image light 340. The output waveguide 320 may be composed of e.g., silicon, plastic, glass, or polymers, or some combination thereof. The output waveguide 320 has a relatively small form factor. For example, the output waveguide 320 may be approximately 50 mm wide along x-dimension, 30 mm long along y-dimension and 0.2-1 mm thick along z-dimension.

The output waveguide 320 receives the image light 340 at one or more coupling elements 350, and guides the received input image light to one or more decoupling elements 360. In some embodiments, the coupling element 350 couples the image light 340 from the waveguide assembly 310 into the output waveguide 320. The coupling element 350 may be, e.g., a diffraction grating, a holographic grating, some other element that couples the image light 340 into the output waveguide 320, or some combination thereof. For example, in embodiments where the coupling element 350 is diffraction grating, the pitch of the diffraction grating is chosen such that total internal reflection occurs, and the image light 340 propagates internally toward the decoupling element 360. For example, the pitch of the diffraction grating may be in the range of 300 nm to 600 nm.

The decoupling element 360 decouples the total internally reflected image light from the output waveguide 320. The decoupling element 360 may be, e.g., a diffraction grating, a holographic grating, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. An orientation and position of the image light exiting from the output waveguide 320 is controlled by changing an orientation and position of the image light 340 entering the coupling element 350. For example, the pitch of the diffraction grating may be in the range of 300 nm to 600 nm.

The controller 330 controls the display operations of the waveguide assembly 310. The controller 330 determines display instructions for the waveguide assembly 310. Display instructions are instructions to render one or more images. In some embodiments, display instructions may simply be an image file (e.g., bitmap). The display instructions may be received from, e.g., a console of a VR system. The controller 330 includes a combination of hardware, software, and/or firmware not shown here so as not to obscure other aspects of the disclosure.

In some embodiments, as described below in conjunction with FIG. 5 and FIG. 6, the pupil replication density of the output waveguide 320 is based in part on a number of partially reflective layers present in the output waveguide 320, and respective locations of the partially reflective layers in the output waveguide 320. As described below with reference to FIG. 8 and FIG. 9, the output waveguide 320 may be formed by at least one of a bonding process and a demolding process.

Figure 4:
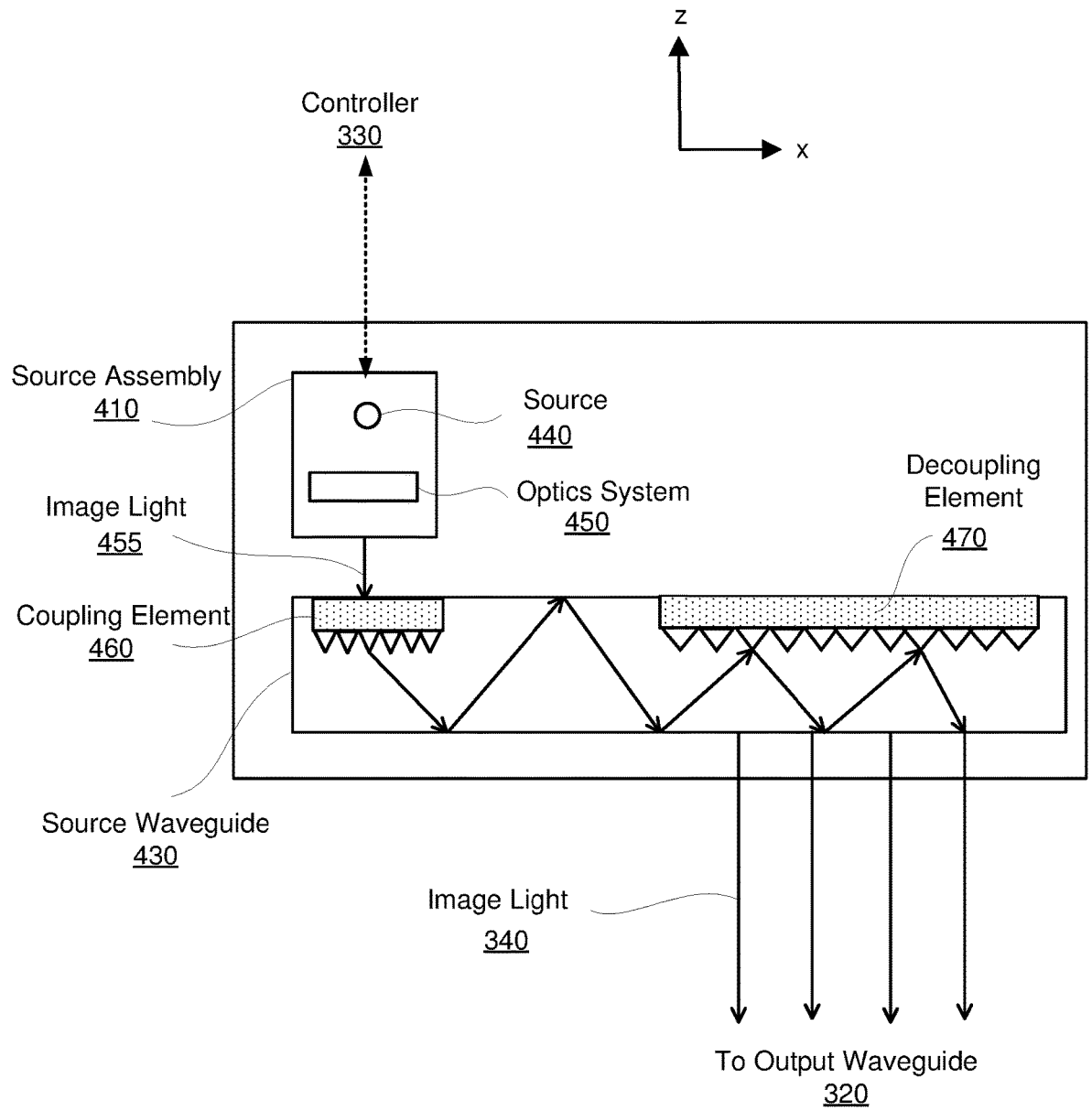
FIG. 4 illustrates a cross-section of a scanning waveguide display, in accordance with an embodiment.

FIG. 4 illustrates a cross-section 400 of the waveguide assembly 300, in accordance with an embodiment. The cross-section 400 of the waveguide assembly 300 includes at least a source assembly 410 and a source waveguide 430. In some embodiments, the scanning waveguide display 300 is a component (e.g., waveguide display assembly 210) of the NED 100. In alternate embodiments, the scanning waveguide display 300 is part of some other NED, or other system that directs display image light to a particular location.

The source assembly 410 generates light in accordance with scanning instructions from the controller 330. The source assembly 410 includes a source 440, and an optics system 450. The source 440 is a source of light that generates at least a coherent or partially coherent image light. The source 440 may be, e.g., a laser diode, a vertical cavity surface emitting laser, a light emitting diode, a tunable laser, or some other light source that emits coherent or partially coherent light. The source 440 emits light in a visible band (e.g., from about 390 nm to 700 nm), and it may emit light that is continuous or pulsed. In some embodiments, the source 440 may be a laser that emits light at a particular wavelength (e.g., 532 nanometers). The source 440 emits light in accordance with one or more illumination parameters received from the controller 330. An illumination parameter is an instruction used by the source 440 to generate light. An illumination parameter may include, e.g., source wavelength, pulse rate, pulse amplitude, beam type (continuous or pulsed), other parameter(s) that affect the emitted light, or some combination thereof.

The optics system 450 includes one or more optical components that condition the light from the source 440. Conditioning light from the source 440 may include, e.g., expanding, collimating, adjusting orientation in accordance with instructions from the controller 330, some other adjustment of the light, or some combination thereof. The one or more optical components may include, e.g., lenses, mirrors, apertures, gratings, or some combination thereof. Light emitted from the optics system 450 (and also the source assembly 410) is referred to as image light 455. The optics system 450 outputs the image light 455 at a particular orientation (in accordance with the scanning instructions) toward the source waveguide 430.

The source waveguide 430 is an optical waveguide. The source waveguide 430 may be composed of one or more materials that facilitate total internal reflection of the image light 455. The source waveguide 430 may be composed of e.g., silicon, plastic, glass, or polymers, or some combination thereof. The source waveguide 430 has a relatively small form factor. For example, the source waveguide 430 may be approximately 50 mm long along x-dimension, 3 mm wide along y-dimension, and 0.5-1 mm thick along z-dimension.

In some embodiments, the source waveguide 430 includes multi-layered substrate. The multi-layered substrate includes a plurality of layers of at least a substrate and one or more partially reflective layers, where a pupil replication density of the light out-coupled by the source waveguide 430 is based in part on a number of the one or more partially reflective layers and respective locations of the one or more partially reflective layers in the source waveguide 430. In these embodiments, the makeup of the source waveguide (i.e., including a plurality of layers of a substrate and at least one partially reflective layer) would be similar to what is discussed in detail below with regard to FIG. 5 in the context of the output waveguide.

The source waveguide 430 includes a coupling element 460 and a decoupling element 470. The source waveguide 430 receives the image light 455 emitted from the source assembly 410 at the coupling element 460. The coupling element 460 couples the image light 455 from the source assembly 410 into the source waveguide 430. The coupling element 460 may be, e.g., a diffraction grating, a holographic grating, some other element that couples the image light 455 into the source waveguide 430, or some combination thereof. The decoupling element 470 decouples the total internally reflected image light 455 from the source waveguide 430. The decoupling element 70 may be, e.g., a diffraction grating, a holographic grating, some other element that decouples image light out of the source waveguide 430, or some combination thereof.

The image light 340 exiting the source waveguide 430 is expanded at least along one dimension (e.g., may be elongated along x-dimension). The image light 340 couples to an output waveguide 320 as described above with reference to FIG. 3.

The controller 330 controls the source assembly 410 by providing scanning instructions to the source assembly 410. The scanning instructions cause the source assembly 410 to render light such that image light exiting the decoupling element 360 of the output waveguide 320 scans out one or more 2D images. For example, the scanning instructions may cause the source assembly 410 (via adjustments to optical elements in the optics system 450) to scan out an image in accordance with a scan pattern (e.g., raster, interlaced, etc.). The scanning instructions control light emitted from the source assembly 410 (via illumination parameters), and the optics system 450 scans out the image by rapidly adjusting orientation of the emitted light. If done fast enough, a human eye integrates the scanned pattern into a single 2D image.

Figure 5:
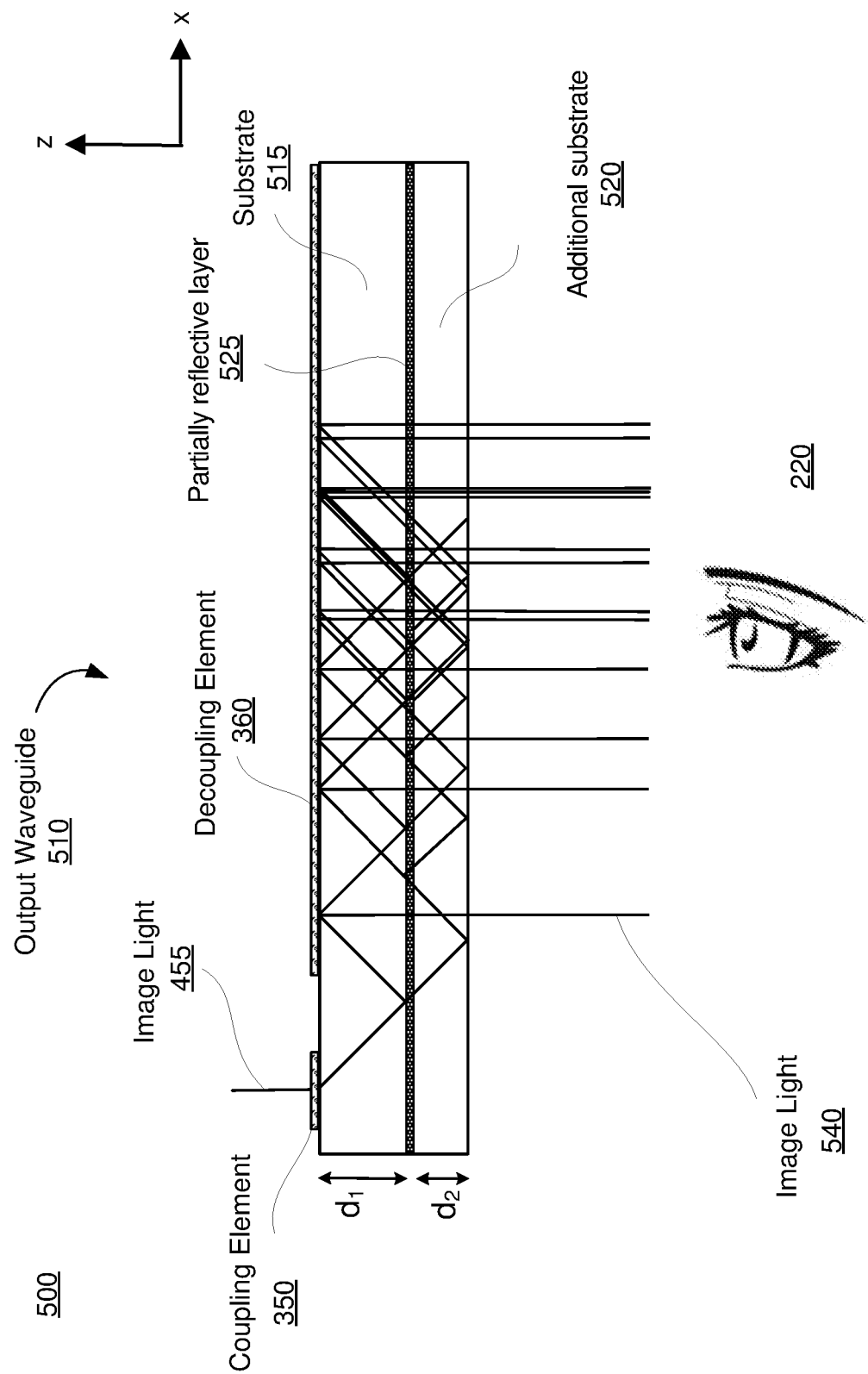
FIG. 5 illustrates a cross-section of an output waveguide including a multi-layered substrate, in accordance with an embodiment.

FIG. 5 illustrates a cross-section 500 of an output waveguide 510 including a multi-layered substrate, in accordance with an embodiment. In some embodiments, the output waveguide 510 is a component (e.g., waveguide display assembly 210) of the NED 100. In alternate embodiments, the output waveguide 510 is part of some other NED, or other system that directs display image light to a particular location.

The output waveguide 510 is an optical waveguide that outputs image light to an eye 220 of a user. The output waveguide 510 includes the coupling element 460, the decoupling element 470, a substrate 515, an additional substrate 520, and one or more partially reflective layers 525. The pupil replication density of the light out-coupled by the output waveguide 510 is based in part on a number of the one or more partially reflective layers 525 and respective locations of the one or more partially reflective layers 525 in the output waveguide 510.

The substrate 515 is a portion of a waveguide body of an optical waveguide. The substrate 515 may be composed of one or more materials with a high refractive index (e.g. 1.5 or above) that facilitate total internal reflection of the image light 455. The substrate 515 may be composed of e.g., silicon, plastic, glass, polymers, or some combination thereof. The substrate 515 has a relatively small form factor. For example, the substrate 515 may be approximately 50 mm wide along x-dimension, 30 mm long along y-dimension and 0.1-0.8 mm thick along z-dimension (i.e. $d_1$).

The additional substrate 520 is substantially similar to the substrate 515 except for the thickness along z-dimension (i.e. $d_2$). In alternate embodiments, the additional substrate 520 is composed of a first material (e.g. glass) and the substrate 515 is composed of a second material (e.g. polymer). In one example, the thickness of the additional substrate 520 is 200 microns and the thickness of the substrate 515 is 300 microns. In another example, the thickness of the additional substrate 520 is 100 microns and the thickness of the substrate 515 is 500 microns. As described below with reference to FIG. 6, the pupil replication density of the output waveguide 510 is determined by at least one of the thickness (i.e. $d_1$) of the substrate 515, a refractive index of the substrate 515, thickness (i.e. $d_2$) of the additional substrate 520, refractive index of the additional substrate 520, or some combination thereof. In some embodiments, as described below with reference to FIG. 8, a manufacturing system performs a bonding process of the additional substrate 520 on to the substrate 515. In alternate embodiments, as described below with reference to FIG. 9, a manufacturing system performs a demolding process of a high-refractive index polymer film to form the additional substrate 520 on the substrate 515.

The partially reflective layer 525 is a layer of an optical waveguide that reflects a portion of light incident on the layer and transmits the remaining portion of incident light. The partially reflective layer 525 may be composed of one or more thin films deposited by a manufacturing system. As described below with reference to FIG. 7, a deposition system performs the deposition of the partially reflective layer 525. The deposition system is based on at least one of Plasma Enhanced Chemical Vapor Deposition (PECVD), sputtering, spin-coating, evaporation, any other surface modification process, or some combination thereof. In one example, the partially reflective layer 525 is a thin film composed of silicon-di-oxide with a thickness in the range of 50 nm to 300 nm. In a different example, the partially reflective layer 525 provides 50% reflection of the light received from a light source with angles of incidence in the range of 35 to 75 degrees with respect to a normal to the surface of the output waveguide 510 and at optical wavelengths in the range of 400 nm to 700 nm. As described below with reference to FIG. 8, the partially reflective layer 525 is formed by performing a bonding of a first wafer coated with a first thin film, and a second wafer coated with a second thin film.

The partially reflective layer 525 may include a stack of one or more thin films of a dielectric material. As described below with reference to FIG. 8, the one or more thin films of the dielectric material is applied to one or both sides of a bonded interface and the one or more wafers are bonded together. As described below with reference to FIG. 9, the partially reflective layer 525 is a thick film of one or more thin films of the dielectric material directly applied to a first wafer prior to coating the partially reflective layer 525.

The output waveguide 510 receives the image light 455 at the coupling element 350, and guides the received input image light to the decoupling element 360. The decoupling element 360 decouples the total internally reflected image light from the output waveguide 510.

Note that the output waveguide 510 outputs the image light 540 with a higher pupil replication density and homogeneity due to the presence of the partially reflective layer 525 located in between the substrate 515 and the additional substrate 520. The example of FIG. 5 shows a single partially reflective layer 525 that is partially reflective to a portion of the image light 455 in a first band of optical wavelength (e.g. red). In alternate configurations, the output waveguide 510 may include a plurality of partially reflective layers 525 with each partially reflective layer partially reflecting a portion of the image light 455 corresponding to different bands (e.g. green, blue, etc.). Each partially reflective layer 525 may be separated from an adjacent partially reflective layer 525 by one or more layers (e.g. substrate 510, additional substrate 520, etc.) of a multi-layered substrate of the output waveguide 510. In the absence of the additional substrate 520 and the partially reflective layer 525, the output waveguide 510 will output the image light 540 with a poor homogeneity of the resulting image due to relatively lower pupil replication density of the image light 455.

Figure 6:
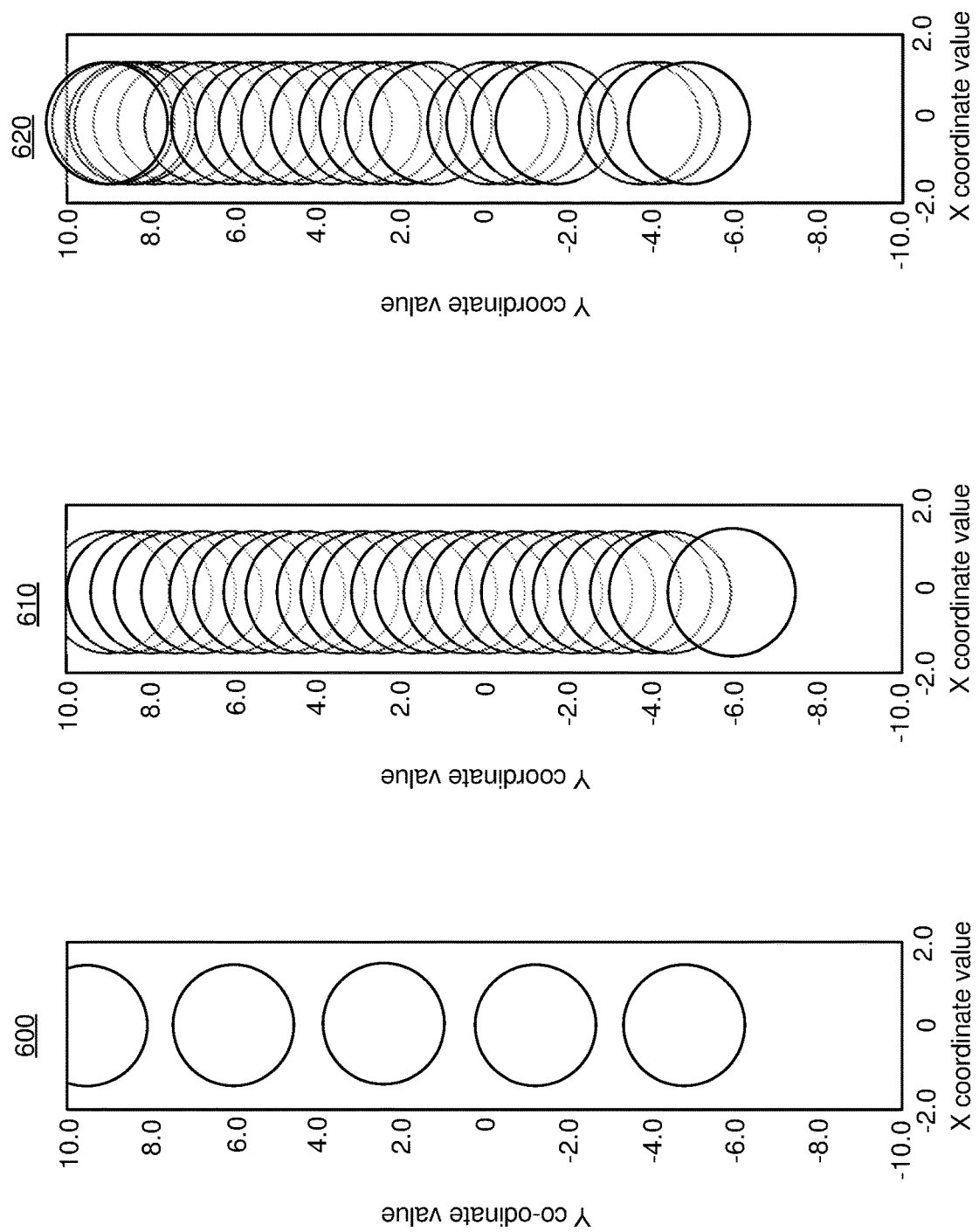
FIG. 6 illustrates simulations of pupil replication density from an output waveguide with a single substrate, an output waveguide with a multi-layered substrate formed by a bonding process, and an output waveguide with a multi-layered substrate formed by a demolding process, in accordance with an embodiment.

FIG. 6 illustrates simulations of pupil replication density from an output waveguide with a single substrate, a multi-layered substrate formed by a bonding process, and a multi-layered substrate formed by a demolding process, in accordance with an embodiment. The simulation of the pupil replication density may correspond to the output waveguide 320, as described above in conjunction with FIG. 3.

As shown in FIG. 6, the simulation 600 corresponds to pupil replication density from an output waveguide with a single substrate of thickness (i.e. $d_1$) along the z-dimension of 500 microns.

The simulation 610 corresponds to pupil replication density from an output waveguide formed by a bonding process from a multi-layered substrate including a partially reflective layer sandwiched between two substrates of different thicknesses (i.e. $d_1$ and $d_2$) along the z-dimension with $d_1$ equal to 300 microns and $d_2$ equal to 200 microns. More details about the bonding process for forming the multi-layered substrate are described below with reference to FIG. 8. Note that the pupil replication density from the output waveguide formed by the bonding process from the multi-layered substrate as shown in the simulation 610 is relatively higher than the pupil replication density from the output waveguide with a single substrate as shown in the simulation 600.

The simulation 620 corresponds to pupil replication density from an output waveguide formed by a demolding process from a multi-layered substrate including a partially reflective layer sandwiched between two substrates of different thicknesses (i.e. $d_1$ and $d_2$) along the z-dimension with $d_1$ equal to 500 microns and $d_2$ equal to 100 microns, and the refractive index of the partially reflective layer is 1.8. More details about the demolding process for forming the multi-layered substrate are described below with reference to FIG. 9. In one example, the simulation 600 corresponds to a pupil replication density of 0.25 pupils/mm, the simulation 610 corresponds to a pupil replication density of 1.8 pupils/mm, and the simulation 620 corresponds to a pupil replication density of 1.2 pupils/mm.

Figure 7:
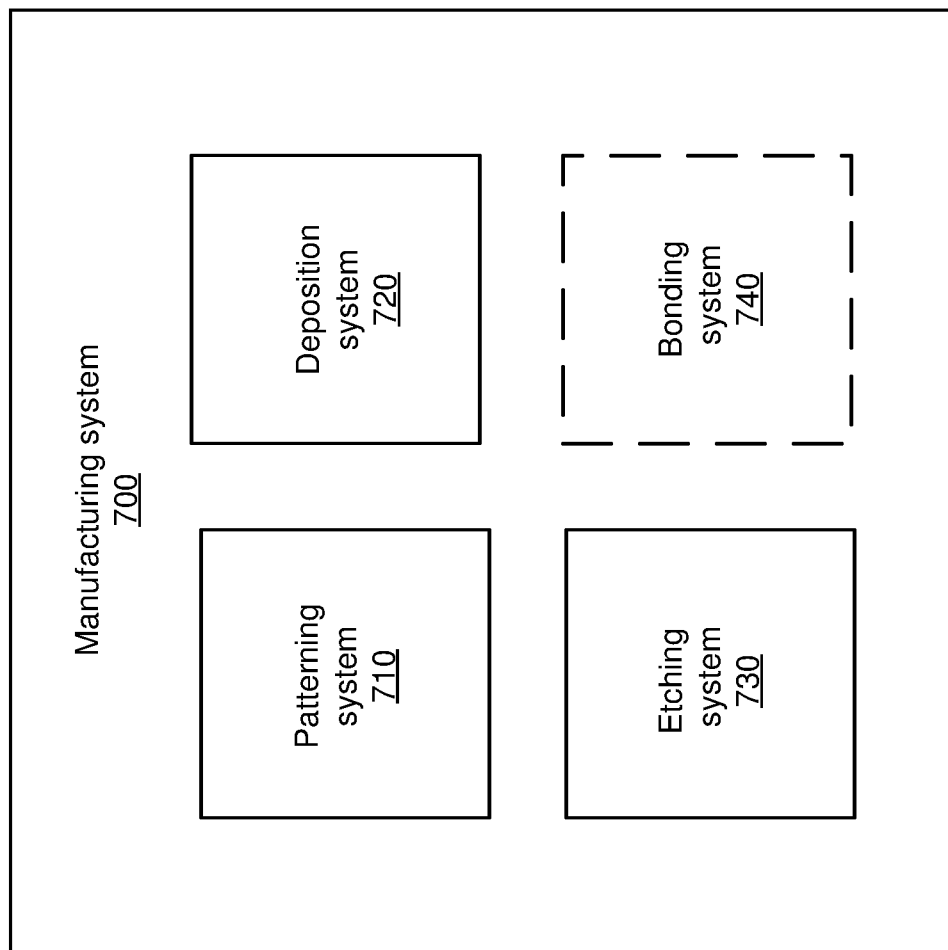
FIG. 7 is a block diagram of a manufacturing system, in accordance with one embodiment.

FIG. 7 is a block diagram of a manufacturing system 700, in accordance with one embodiment. The manufacturing system 700 is a set of systems that produces a portion of an output waveguide that includes an input area, a plurality of layers of at least a substrate, one or more partially reflective layers, and an output area. The manufacturing system 700 includes a patterning system 710, a deposition system 720, an etching system 730, a bonding system 740, or some combination thereof. The manufacturing system 700 may be similar to a system of fabricating devices used to form an integrated circuit, and may include such components as an etching component, a thin film manufacturing component, an oxidation component, and so on. In some embodiments, the manufacturing system 700 includes a controller (not shown here) that controls each system in the manufacturing system 700.

The patterning system 710 is a system that performs a patterning of a substance formed on a substrate creating a change in geometry of the substance. In some embodiments, the patterning system 710 includes a convection oven, a hot plate, a cool plate, an infrared lamp, a wafer spinner, a droplet dispenser, an ink-jet system, a mask aligner, an exposure system, a wet bench based developer system, or some combination thereof. In one example, the patterning system 710 includes a pair of convection ovens for processing batches of wafers through hard and soft baking for dehydration purposes at a temperature in the range of 150–200° C., a programmable wafer spinner, a contact-type mask aligner, and an exposure system with a mercury source of intensity close to 25 mW/cm$^2$.

In alternate embodiments, the patterning system 710 includes an imprinting system that performs a mechanical stamping of a pattern on a substrate. In one example, the imprinting system performs a transfer of a pattern onto the substrate based on a removal of a residual polymeric layer and a subsequent removal of features imprinted into the patterned substrate. The patterning system 710 includes a thermal imprinting system, an ultraviolet imprinting system, a jet and flash imprinting system, a reverse imprinting system, or some combination thereof. The thermal imprinting system is a system that applies a mechanical force on a pre-heated stamp against a thermoplastic polymer that was previously spin-coated on the substrate. The ultraviolet imprinting system is a system that applies an ultraviolet radiation on a low-viscosity, UV-curable polymer (e.g. PDMS, HSQ) to cross-link the polymer followed by releasing the mold from the substrate. The jet and flash imprinting system is a system that dispenses the polymer on the substrate through one or more ink jets at a low pressure and temperature compared to the thermal imprinting system and the ultraviolet imprinting system. The reverse imprinting system is a system that coats a polymer directly onto a template and releases the patterned substrate by tuning the surface energies of the template and the substrate.

The deposition system 720 is a system that adds one or more thin films of materials on the substrate patterned by the patterning system 710. In the example of FIG. 7 described below, the deposition system 720 deposits one or more thin films of materials to form one or more partially reflective layers of an optical waveguide. The deposition system 720 adds the thin films of materials on the substrate based on a physical vapor deposition, a chemical vapor deposition, an atomic layer deposition, a spin coating system, or some combination thereof, as described below in conjunction with FIG. 5. In some configurations, the deposition system 720 deposits thin films of materials selected from a group consisting of: an organic polymer, a dielectric layer, or some combination thereof. For example, the deposition system 720 deposits one or more layers of silicon di-oxide, SSQ derivatives, an organic polymer, titanium di-oxide, hafnium di-oxide, silicon nitride, or some combination thereof.

The deposition system 720 may include an electron-beam evaporator, a magnetron sputter, a reactive sputter, a low pressure chemical vapor deposition (LPCVD) reactor, a plasma-enhanced chemical vapor deposition (PECVD) reactor, an atomic layer deposition (ALD) reactor, or some combination thereof. The electron-beam evaporator is based on a form of physical vapor deposition in which a target anode is bombarded with an electron beam given off by a charged tungsten filament under high vacuum. The electron beam causes atoms from the target to transform into the gaseous phase. The atoms from the target then precipitate into a solid form, coating everything in the vacuum chamber within line of sight with a thin layer of the anode material. The magnetron sputter uses a strong electric and magnetic fields to confine charged plasma particles close to the surface of the sputter target. In a magnetic field, electrons follow helical paths around magnetic field lines, undergoing more ionizing collisions with gaseous neutrals near the target surface than would otherwise occur. The reactive sputter is based on the sputtered particles undergoing a chemical reaction before coating the substrate. The chemical reaction that the particles undergo is with a reactive gas introduced into the sputtering chamber such as oxygen or nitrogen. The low pressure chemical vapor deposition (LPCVD) reactor is based on a chemical process at a pressure lower than the atmospheric pressure in which the substrate is exposed to one or more volatile precursors which react and/or decompose on the substrate surface to produce the desired deposit. The plasma-enhanced chemical vapor deposition (PECVD) is based on a chemical process that utilizes plasma to enhance the chemical reaction rates of the volatile precursors allowing deposition at lower temperatures. In some configurations, the deposition system 720 performs the deposition of organic coatings such as plasma polymers at a temperature relatively lower than the room temperature. The atomic layer deposition (ALD) reactor is based on a chemical process in which alternating monolayers of two elements are deposited onto a substrate by alternatively pulsing the chemical reactants in a reaction chamber and then chemisorbing in a saturated manner on the surface of the substrate, forming a chemisorbed monolayer. In some configurations, the deposition system 720 includes a controller (not shown here) that controls a number of cycles of pulsing the precursors into the reaction chamber, the deposition time for each pulsing, and the time for purging the reaction chamber after each pulsing.

The etching system 730 is a system that removes one or more thin films of materials deposited on the substrate patterned by the patterning system 710. The etching system 730 is based on a physical process, a chemical process, or some combination thereof. The etching system 730 selectively removes a first set of one or more thin films of materials at a different rate of removal when compared to a second set of one or more thin films of materials in a multi-layered stack of materials deposited on the substrate. The etching system 730 includes a wet bench, an ion milling module, a plasma based reactive ion etching module, a chemical mechanical polishing module, a compression system, or some combination thereof. In a first configuration, the etching system 730 includes a wet bench which performs a chemical etching using a combination of acids, bases, and solvents at a range of temperatures and concentrations. In a second configuration, the etching system 730 includes an ion milling module that performs a physical removal of a portion of the thin films deposited on the substrate at an extremely low pressure and using a high accelerating potential in order to accelerate electrons impacting the neutral gas atoms with enough energy to ionize the gas atoms. In a third configuration, the etching system 730 includes a plasma based reactive ion etching (RIE) module based on a chemically reactive plasma at a low pressure and an external electromagnetic field to remove one or more thin films of material deposited on the substrate. In a fourth configuration, the etching system 730 includes a chemical mechanical polishing (CMP) module that performs smoothening of one or more thin films of materials based on a combination of chemical and mechanical forces. In some examples, the etching system 730 uses an abrasive and corrosive chemical slurry along with a polishing pad and retaining ring to perform the chemical mechanical polishing on one or more thin films deposited on the substrate patterned by the patterning system 710. In a fifth configuration, the etching system 730 includes a compression system that includes one or more optically flat surfaces that perform a mechanical squeezing of a liquid resin. In some configurations, the compression system includes one or more vacuum systems that hold the substrate during the compression process. In some examples, at least one of the optically flat surfaces is treated with fluorinated compounds or other chemicals to prevent the liquid resin with high refractive index to permanently adhere to the optically flat surfaces. The compression system may include a measuring device (e.g. profilometer, ellipsometer, interferometer, etc.) that measures at least one of flatness of wafer, thickness of wafer, and wedge. In some configurations, the compression system includes a controller that controls the motion of the one or more optically flat surfaces to minimize accumulation of elastic energy and stress inside the liquid resin.

The bonding system 740 is a system that performs a bonding of one or more substrates to form an optical waveguide. The bonding system 740 performs the bonding of one or more substrates based on at least one of: a direct bonding, a surface activated bonding, a plasma activated bonding, an anodic bonding, an eutectic bonding, a glass frit bonding, an adhesive bonding, a thermocompression bonding, a reactive bonding, a transient liquid phase diffusion bonding, or some combination thereof. In one example, the bonding system 740 performs the bonding of one or more substrates by performing a preprocessing of substrates, a pre-bonding at room temperature, and an annealing at elevated temperatures. In some embodiments, the bonding system 740 uses a gluing agent to perform a fusion bonding of one or more substrates. The gluing agent is an organic film composed of solvent-based adhesives, polymer dispersion adhesives, pressure-sensitive adhesives, contact adhesives (e.g. neoprene), multi-part adhesives (e.g. polyester resin, polyols, acrylic polymers, etc.), or some combination thereof. The gluing agent may contain one or more solvents that can be baked out in a subsequent process.

In some embodiments, the bonding system 740 performs the bonding of one or more substrates that may not have any film deposited using a gluing agent. In such configurations, the gluing agent is a portion of a partially reflective layer that reflects a portion of light incident on an optical waveguide.

In some embodiments, the deposition system 720 adds one or more thin film of materials of a threshold value of thickness on a first wafer, as described below in conjunction with FIG. 8. The etching system 730 performs a polishing of the thin film of materials deposited by the deposition system 720, as described below in detail in conjunction with FIG. 8. In alternate embodiments, the patterning system 710 adds a polymer film with a high refractive index (e.g. 1.43 to 2.15) on the one or more thin films of materials deposited by the deposition system 720, as described below in conjunction with FIG. 9. The patterning system 710 performs a curing of the polymer film either by heat or UV light, as described below in conjunction with FIG. 9.

Figure 8:
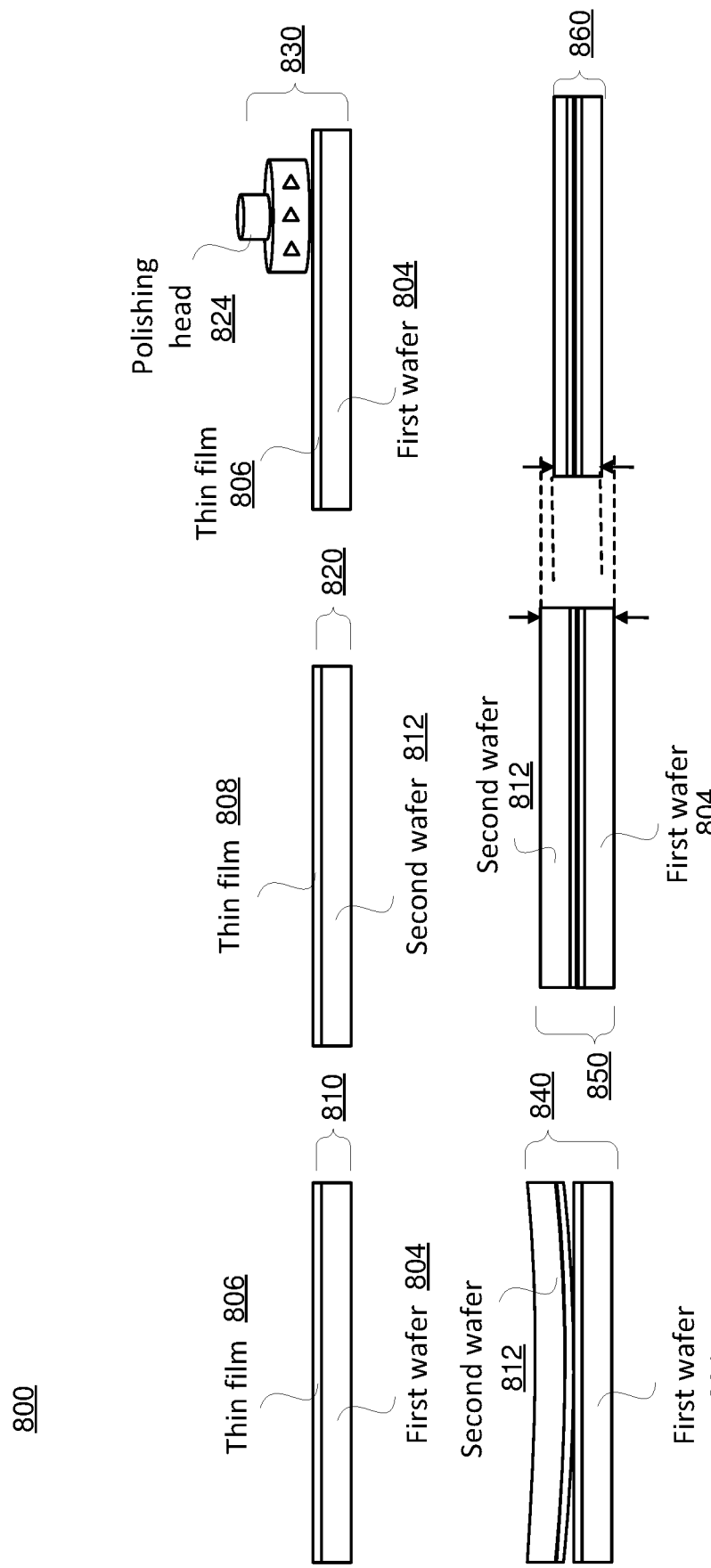
FIG. 8 is an illustration of a bonding process of creating an optical waveguide from a bonding of substrates performed by the manufacturing system of FIG. 7, in accordance with one embodiment.

FIG. 8 is an illustration of a bonding process 800 of creating an optical waveguide from a bonding of substrates performed by the manufacturing system 700 of FIG. 7, in accordance with one embodiment. The bonding process 800 of FIG. 8 may be performed by the manufacturing system 700. Other entities may perform some or all of the steps of the process in other embodiments. Likewise, embodiments may include different and/or additional steps, or perform the steps in different orders.

The manufacturing system 700 deposits 810 (e.g., via the deposition system 720) a thin film 806 on a first wafer 804. The first wafer 804 is an embodiment of the substrate 515. In one example, the thin film 806 is composed of one or more layers of silicon-di-oxide of thickness in the range of 50 nm to 300 nm, and the first wafer 804 is composed of at least one of polymer, or glass of thickness in the range of 200 microns to 800 microns. The deposition system 720 deposits 810 the thin film 806 based on at least one of PECVD, sputtering, spin-coating, evaporation, any other surface modification technique, or some combination thereof.

The manufacturing system 700 (e.g., via the deposition system 720) deposits 820 a thin film 808 on a second wafer 812. The second wafer 812 is an embodiment of the substrate 515. The thin film 808 is an embodiment of the thin film 806. The second wafer 812 is an embodiment of the first wafer 804. In some configurations, the deposition system 720 deposits 820 the thin film 806 on the second wafer 812.

The manufacturing system 700 (e.g., via the etching system 730) performs 830 a polishing of the thin film 806 deposited on the first wafer 804. In some embodiments, the manufacturing system 700 (e.g. via the etching system 730) performs 830 a polishing of the thin film 806 deposited on the first wafer 804 and a polishing of the thin film 808 deposited on the second wafer 812. In some configurations, the manufacturing system may not perform the polishing of the thin film 806. In the example of FIG. 8, the manufacturing system 700 includes a polishing head 824 that performs a polishing of the thin film 806 to achieve a threshold value of thickness and flatness. For example, the polishing head 824 polishes the thin film 806 to achieve a thickness in the range of 25 nm to 250 nm.

The manufacturing system 700 (e.g., via the bonding system 740) performs 840 a bonding of the first wafer 804 coated with the thin film 806 and the second wafer 812 coated with the thin film 808. In one example, the bonding system 740 may perform the bonding of the first wafer 804 and the second wafer 812 at room temperature. In some embodiments, as described above with reference to FIG. 7, the bonding system 740 uses a gluing agent to perform the bonding of the first wafer 804 to the second wafer 812.

The manufacturing system 700 (e.g., via the bonding system 740) performs 850 an annealing of the first wafer 804 and the second wafer 812. In one example, the manufacturing system 700 performs the annealing at a temperature in the range of 100° C. to 250° C. Each of the first wafer 804, the polished thin film 806, the second wafer 812, and the polished second film 808 form a portion of an intermediate multi-layered substrate.

The manufacturing system 700 (e.g., via the etching system 730) performs 860 a grinding and polishing of at least one of the first wafer 804 and the second wafer 812 to achieve a threshold value of thickness. Each of the polished first wafer 804, the polished thin film 806, the polished second wafer 812, and the polished second film 808 form a portion of a multi-layered substrate. Note that the pupil replication density of light out-coupled by the optical waveguide is based in part on a number of each of the thin film 806 and the thin film 808, and respective locations of each of the thin film 806 and the thin film 808 in the optical waveguide.

The bonding process 800 forms a multi-layered substrate that is part of an optical waveguide, and the multi-layered substrate has a plurality of layers including at least the first wafer 804 and the second wafer 812, and one or more partially reflective layers including the thin film 806 and the thin film 808 located in between the first wafer 804 and the second wafer 812. In some embodiments, the manufacturing system 700 repeats the bonding process 800 to form the multi-layered substrate. In one example, the multi-layered substrate formed by repeating the bonding process 800 for 'n' number of levels. The levels may include 'n' number at least one of the first wafer 804, at least one of the thin film 806, at least one of the thin film 808, and at least one of the second wafer 812.

Figure 9:
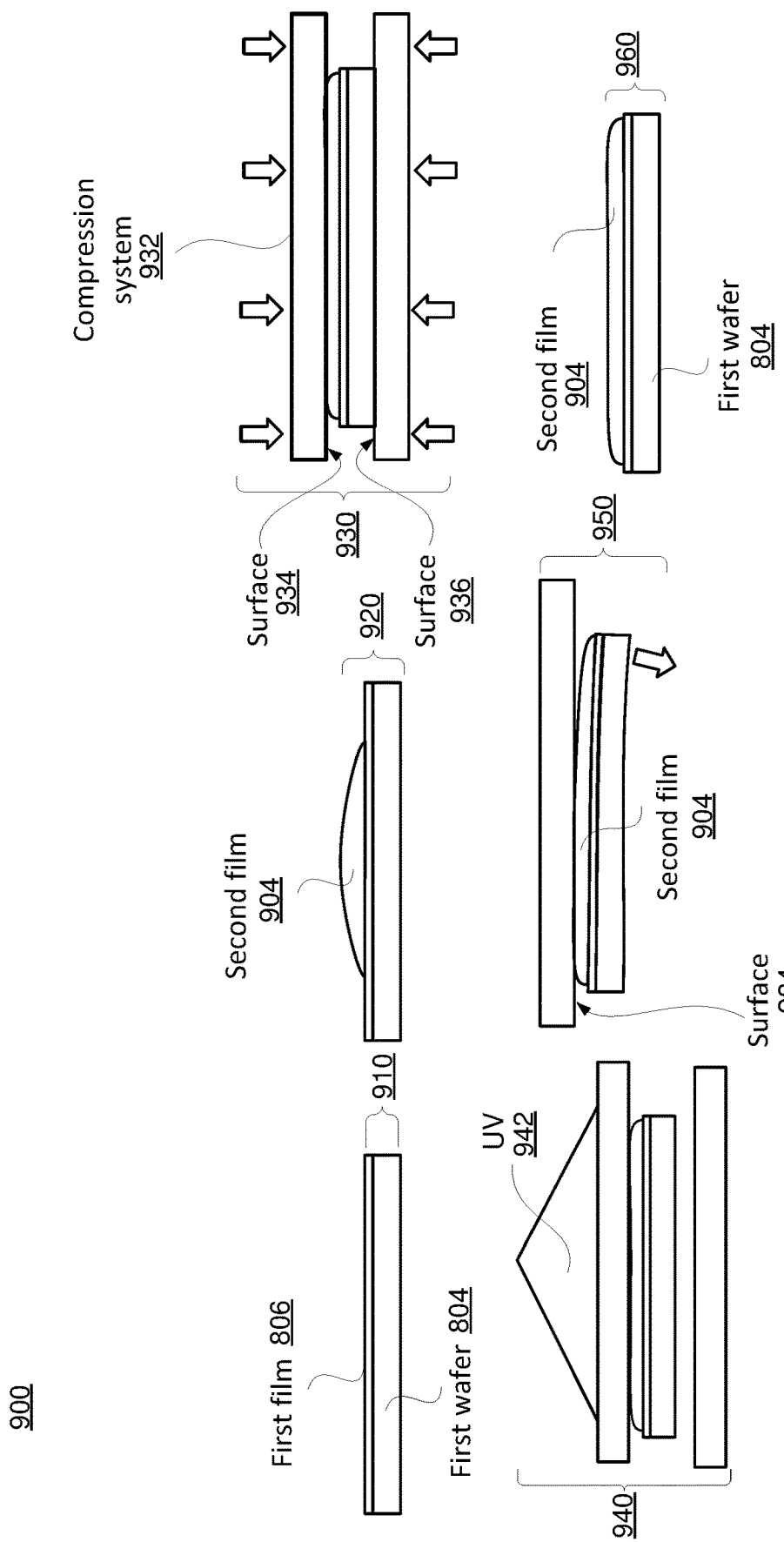
FIG. 9 is an illustration of a demolding process of creating an optical waveguide from a demolding of a cured polymer film performed by the manufacturing system of FIG. 7, in accordance with one embodiment.

FIG. 9 is an illustration of a demolding process 900 of creating an optical waveguide from a demolding of a cured polymer film performed by the manufacturing system 700 of FIG. 7, in accordance with one embodiment. The demolding process 900 of FIG. 9 may be performed by the manufacturing system 700. Other entities may perform some or all of the steps of the process in other embodiments. Likewise, embodiments may include different and/or additional steps, or perform the steps in different orders.

The manufacturing system 700 (e.g., via the deposition system 720) performs 910 a deposition of the first film 806 on the first wafer 804. The first wafer 804 is an embodiment of the substrate 515. In one example, the thin film 806 is composed of one or more layers of silicon-di-oxide of thickness in the range of 50 nm to 300 nm, and the first wafer 804 is composed of at least one of polymer, or glass, and the first wafer 804 has a thickness in the range of 200 microns to 800 microns. The deposition system 720 deposits the thin film 806 based on at least one of PECVD, sputtering, spin-coating, evaporation, any other surface modification technique, or some combination thereof. In some embodiments, the manufacturing system 700 may not perform the deposition of the first film 806 on the first wafer 804.

The manufacturing system 700 (e.g., via the patterning system 710) performs 920 a deposition of a second film 904. In some configurations, the manufacturing system 700 performs 920 the deposition of the second film 904 on the first film 806. The second film 904 is a liquid resin with a refractive index in the range of 1.43 to 2.15. The patterning system 710 deposits the second film 904 based on at least one of a droplet dispensing process, an ink-jetting process, a spin-coating process, or some combination thereof. Each of the first wafer 804, the first film 806, and the second film 904 forms an intermediate multi-layered substrate.

The manufacturing system 700 performs 930 a compression of the second film 904 to form an intermediate multi-layered substrate. The manufacturing system 700 includes a compression system 932 with a surface 934 and the surface 936. Each of the surface 934 and the surface 936 is an optically flat surface of the compression system 932. The manufacturing system 700 performs a mechanical squeezing of the second film 904. In some configurations, the manufacturing system 700 includes one or more vacuum systems that hold the first wafer 804 during the compression process. Each of the surface 934 and the surface 936 may be treated with fluorinated compounds or other chemicals to prevent the second film 904 to permanently adhere to the surface 934 and the surface 936. The manufacturing system 700 may include a measuring device (e.g. profilometer, ellipsometer, interferometer, etc.) that measures at least one of flatness of the first wafer 804, and thickness of the first wafer 804. In some configurations, the manufacturing system 700 includes a controller that controls the motion of the surface 934 and the surface 936 to minimize accumulation of elastic energy and stress inside the second film 904.

The manufacturing system 700 performs 940 a curing of the second film 904 in the intermediate multi-layered substrate. In some embodiments, the manufacturing system 700 performs 940 the curing by exposing the second film 904 to an UV radiation 942. In alternate embodiments, the manufacturing system 700 performs 940 the curing of the second film 904 by annealing the second film 904 at a temperature in the range of 100° C. to 250° C. The curing of the second film 904 results in a shrinkage in the volume of the second film 904.

The manufacturing system 700 performs 950 a demolding of the cured second film 904 from the surface 934 of the compression system. In some embodiments, the manufacturing system 700 includes a controller (not shown here) that is coupled to the compression system to perform 950 the demolding of the cured second film 904 from the surface 934. Each of the first film 806, the cured second film 904, and the first wafer 804 form a portion of a multi-layered substrate. Note that the pupil replication density of light out-coupled by the optical waveguide is based in part on a number of the first film 806, and the cured second film 904 and respective locations of the first film 806, and the cured second film 904 in the multi-layered substrate of the optical waveguide.

The demolding process 900 forms a multi-layered substrate that is a part of an optical waveguide, and the multi-layered substrate has a plurality of layers of at least the first wafer 804, and one or more partially reflective second films 904 located in between the plurality of first wafers 804. In some embodiments, the manufacturing system 700 repeats the demolding process 900 to form the multi-layered substrate. In one example, the multi-layered substrate formed by repeating the demolding process 900 for 'n' number of levels. The number of levels may include 'n' number of each at least one of the first wafer 804, at least one of the first film 806, and at least one of the cured second film 904.

Figure 10:
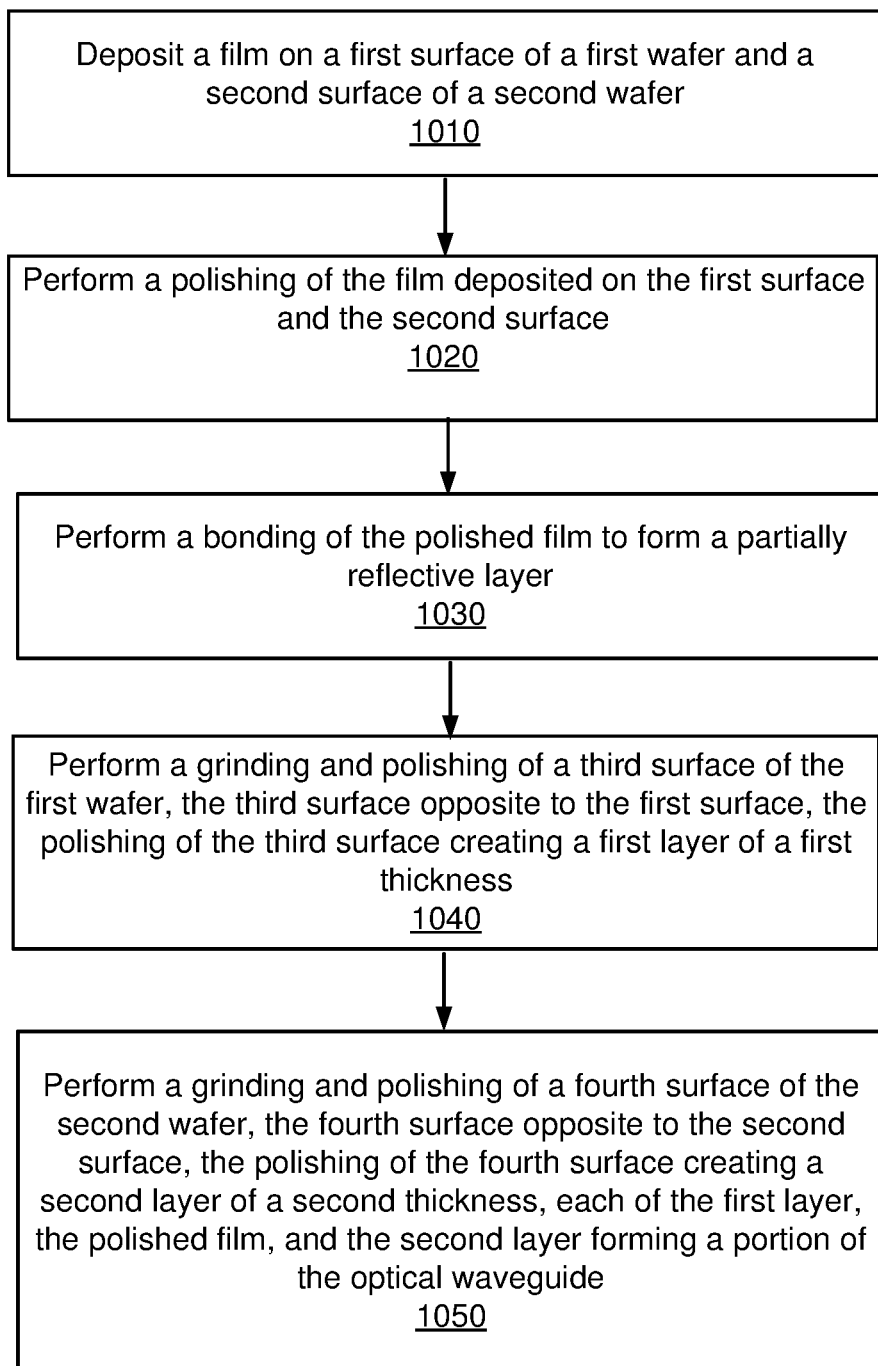
FIG. 10 is a flowchart illustrating the bonding process performed by the manufacturing system of FIG. 7, in accordance with one embodiment.

FIG. 10 is a flowchart illustrating a bonding process 1000 performed by the manufacturing system 700 of FIG. 7, in accordance with one embodiment. The bonding process 1000 of FIG. 10 may be performed by the manufacturing system 700. Other entities may perform some or all of the steps of the process in other embodiments. Likewise, embodiments may include different and/or additional steps, or perform the steps in different orders.

The manufacturing system 700 performs 1010 a deposition of a first film on a first surface of a first wafer and a second film on a second surface of a second wafer. The first film and the second film are thin films. The first film may be, e.g., composed of one or more layers of silicon-di-oxide. The second film is composed of the same materials as the first film. The first film and the second film each have a thickness that is at least 25 nm, and generally substantially larger than 25 nm. The first wafer is composed of a first substrate material. The second wafer may be composed of the first substrate material, or some other substrate material. Each of the first wafer and the second wafer have a thickness of at least 200 microns.

The manufacturing system 700 performs 1020 a polishing of the first film and the second film deposited on the first surface and the second surface. In one example, the manufacturing system 700 performs a polishing of the first film and the second film to achieve a threshold value of thickness and flatness. For example, the manufacturing system 700 polishes the first film to achieve a thickness in the range of 25 nm to 250 nm.

The manufacturing system performs 1030 a bonding of the polished first film on the first surface and the polished second film on the second surface to form a partially reflective layer. The bonding system 740 may perform the bonding of the first film and the second film at room temperature. In some embodiments, as described above with reference to FIG. 7, the bonding system 740 uses a gluing agent to perform the bonding of the first film to the second film.

The manufacturing system 700 performs 1040 a grinding and polishing of a third surface (i.e. opposite to the first surface) of the first wafer. In one example, the manufacturing system 700 performs the polishing of the third surface to create a first layer of a first thickness. For instance, the first layer has a first thickness in the range of 100 microns to 400 microns.

The manufacturing system 700 performs 1050 a grinding and polishing of a fourth surface (i.e. opposite to the second surface) of the second wafer. The manufacturing system 700 performs the polishing of the fourth surface to create a second layer of a second thickness. In one example, the second layer has a second thickness in the range of 100 microns to 400 microns. Each of the first layer, the partially reflective layer, and the second layer form a portion of a multi-layered substrate. Note that the pupil replication density of light out-coupled by the optical waveguide is based in part on a number of the partially reflective layers and respective locations of the partially reflective layers in between the first wafer and the second wafer of the optical waveguide.

The bonding process 1000 forms an optical waveguide with a plurality of layers of at least a first wafer and a second wafer, and one or more polished films located in between the first wafer and the second wafer. In some embodiments, the manufacturing system 700 repeats the bonding process 1000 to form the multi-layered substrate. In one example, the multi-layered substrate formed by repeating the bonding process 1000 for 'n' number of levels may include 'n' number of each of the first wafer, the second wafer, and one or more polished films located in between the first wafer and the second wafer.

Figure 11:
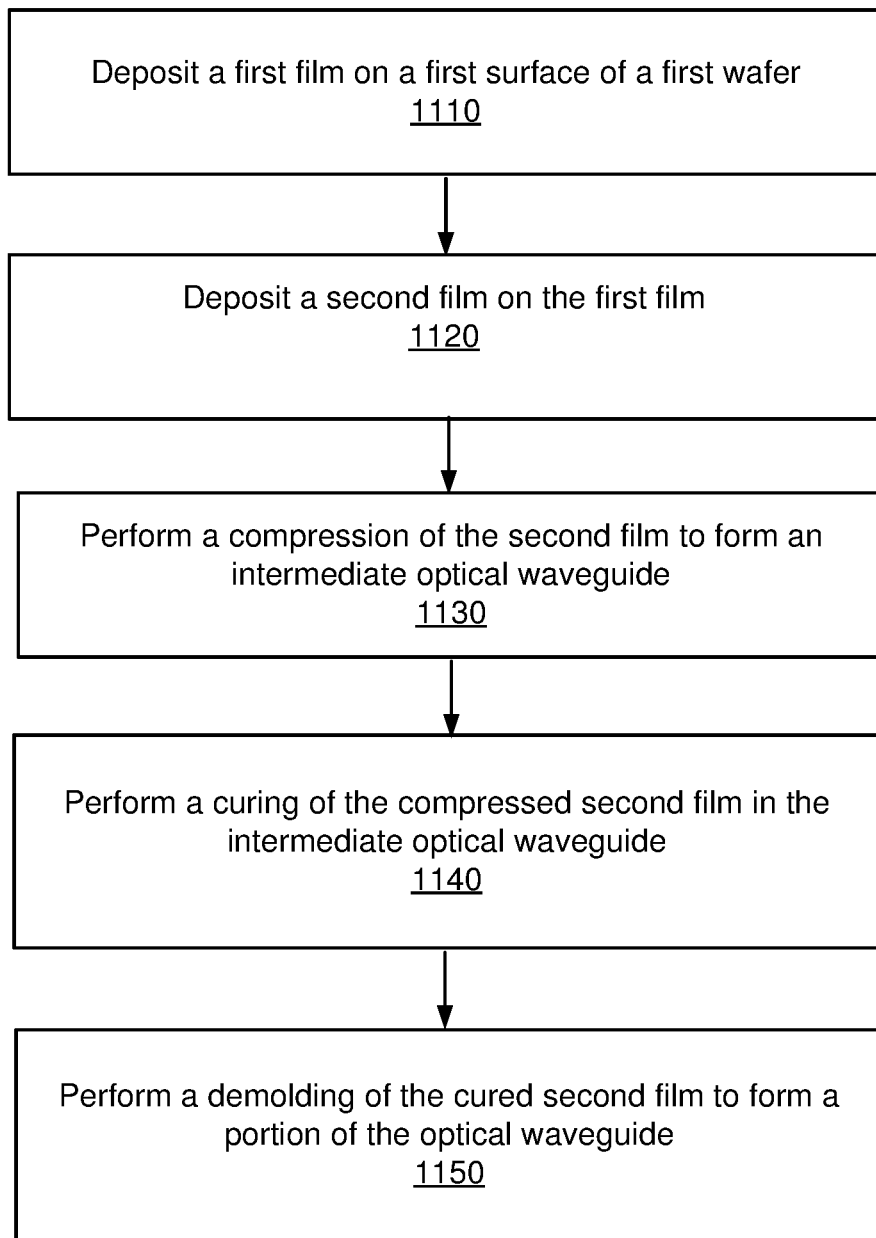
FIG. 11 is a flowchart illustrating the demolding process performed by the manufacturing system of FIG. 7, in accordance with one embodiment.

FIG. 11 is a flowchart illustrating a demolding process 1100 performed by the manufacturing system of FIG. 7, in accordance with one embodiment. The process 1100 of FIG. 11 may be performed by the manufacturing system 700. Other entities may perform some or all of the steps of the process in other embodiments. Likewise, embodiments may include different and/or additional steps, or perform the steps in different orders.

The manufacturing system 700 performs 1110 a deposition of a first film on a first surface of a wafer. In one example, the first film is composed of one or more layers of silicon-di-oxide of thickness in the range of 50 nm to 300 nm, and the first wafer is composed of at least one of polymer, or glass of thickness in the range of 200 microns to 800 microns.

The manufacturing system 700 performs 1120 a deposition of a second film of materials on the first film. The second film is a liquid resin with a refractive index in the range of 1.43 to 2.15. The manufacturing system 700 deposits the second film based on at least one of a droplet dispensing process, an ink-jetting process, a spin-coating process, or some combination thereof. Each of the wafer, the first film, and the second film forms an intermediate multi-layered substrate.

The manufacturing system 700 performs 1130 a compression of the second film to form an intermediate multi-layered substrate. The manufacturing system 700 performs a mechanical squeezing of the second film. In some configurations, the manufacturing system 700 (e.g. via the etching system 730) includes one or more vacuum systems that hold the first wafer during the compression process. The etching system 730 may include a measuring device (e.g. profilometer, ellipsometer, interferometer, etc.) that measures at least one of flatness of the first wafer, and thickness of the first wafer.

The manufacturing system 700 performs 1140 a curing of the compressed second film in the intermediate multi-layered substrate. In some embodiments, as described above in conjunction with FIG. 10, the manufacturing system 700 (e.g. via the patterning system 710) performs the curing by exposing the second film to an UV radiation. In alternate embodiments, the manufacturing system 700 performs the curing of the second film 904 by annealing the second film at a temperature in the range of 100° C. to 250° C.

The manufacturing system 700 performs 1150 a demolding of the cured second film to form a portion of a multi-layered substrate. In some embodiments, the manufacturing system 700 includes a controller (not shown here) that is coupled to the compression system to perform the demolding of the cured second film. Each of the first film, the cured second film, and the wafer form a portion of a multi-layered substrate. Note that the pupil replication density of light out-coupled by the optical waveguide is based in part on a number of the first film and the cured second film and respective locations of the first film and the cured second film in the multi-layered substrate.

The demolding process 1100 forms an optical waveguide with a plurality of layers of at least a first wafer, and one or more partially reflective second films located in between the plurality of first wafers. In some embodiments, the manufacturing system 700 repeats the demolding process 1100 to form the multi-layered substrate. In one example, the multi-layered substrate formed by repeating the demolding process 1100 for 'n' number of levels may include 'n' number of each of the wafer, the first film, and the cured second film.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A multi-layered substrate formed by:
   depositing at least one of a first film on a first surface of a first wafer and a second film on a second surface of a second wafer, the first wafer comprising a third surface opposite to the first surface, the second wafer comprising a fourth surface opposite to the second surface;
   performing a polishing of the first film and a polishing of the second film deposited on the first surface and the second surface;
   performing a bonding of the polished first film on the first surface and the polished second film on the second surface, the bonding forming a partially reflective layer that spans an entire length of the multi-layered substrate, wherein the polished first film and the polished second film have respective indices of refraction that are both isotropic;

performing a grinding and polishing of the third surface of the first wafer, the grinding and polishing of the third surface creating a first layer of a first thickness; and performing a grinding and polishing of the fourth surface of the second wafer, the grinding and polishing of the fourth surface creating a second layer of a second thickness, each of the first layer, the partially reflective layer, and the second layer forming a portion of the multi-layered substrate, wherein the multi-layered substrate is part of an optical waveguide, and light coupled into the optical waveguide is partially reflected and partially transmitted by the partially reflective layer such that portions of the light propagate along a length of the partially reflective layer in the first layer, the second layer, and a combination of the first layer and the second layer that spans an entire length of the optical waveguide.

2. The multi-layered substrate of claim 1, wherein each of the first thickness of the first layer and the second thickness of the second layer determine a pupil replication density of light out-coupled by the optical waveguide.

3. The multi-layered substrate of claim 1, further comprising:
performing a bonding of the first film on the first surface and the second film on the second surface using a gluing agent, the bonding forming the partially reflective layer.

4. The multi-layered substrate of claim 1, further comprising:
performing a bonding of the first film on the first surface using a gluing agent configured to partially reflect a portion of an incident light, the bonding forming the partially reflective layer.

5. The multi-layered substrate of claim 1, wherein each of the first film and the second film is composed of one or more thin films configured to partially reflect a portion of light incident on the one or more thin films.

6. The multi-layered substrate of claim 1, wherein the first thickness of the first layer is greater than the second thickness of the second layer.

* * * * *